United States Patent [19]
Hsu

[11] Patent Number: 5,875,941
[45] Date of Patent: Mar. 2, 1999

[54] CAP ASSEMBLY FOR A CONTAINER

[75] Inventor: James Hsu, Tainan City, Taiwan

[73] Assignee: Fuu Hwa Vacuum Bottle Co., Ltd., Tainan City, Taiwan

[21] Appl. No.: 806,141

[22] Filed: Feb. 25, 1997

[51] Int. Cl.⁶ .................................................. A47G 19/14
[52] U.S. Cl. ...................... 222/475.1; 222/471; 222/509; 222/511; 222/518; 222/715
[58] Field of Search ............... 222/475.1, 14.5, 222/471, 472, 473, 511, 509, 518; 220/715

[56] References Cited

U.S. PATENT DOCUMENTS

| | | | |
|---|---|---|---|
| 4,648,535 | 3/1987 | Zimmermann | 222/472 |
| 5,037,015 | 8/1991 | Collins | 222/472 |
| 5,615,808 | 4/1997 | Huang | 222/472 |

*Primary Examiner*—David J. Walczak
*Assistant Examiner*—Timothy L. Maust
*Attorney, Agent, or Firm*—Finnegan, Henderson, Farabow, Garrett & Dunner, L.L.P.

[57] ABSTRACT

A cap assembly includes a valve seat member having a tubular outer wall adapted to be mounted on an open top end of a container, and an inner tube disposed in the outer wall and having an axis parallel to an axis of the outer wall. The inner tube has a bottom end formed with an aperture. The outer wall is formed with a radial outlet. The valve seat member further has an L-shaped fluid conduit with an open bottom end that is adapted to communicate an interior of the container with the radial outlet. A stem member extends upwardly through the inner tube via the aperture and has a bottom end provided with a valve piece. The stem member is biased such that the valve piece seals the open bottom end of the fluid conduit. A cap body has a top portion formed with an opening, and a peripheral portion mounted on a top end of the outer wall of the valve seat member. A press member has an operating portion extending upwardly and slidably through the opening and a pressing portion abutting against a top end of the stem member. The stem member is movable downwardly such that the valve piece is moved away from the open bottom end of the fluid conduit when the operating portion of the press member is pressed downwardly.

8 Claims, 6 Drawing Sheets

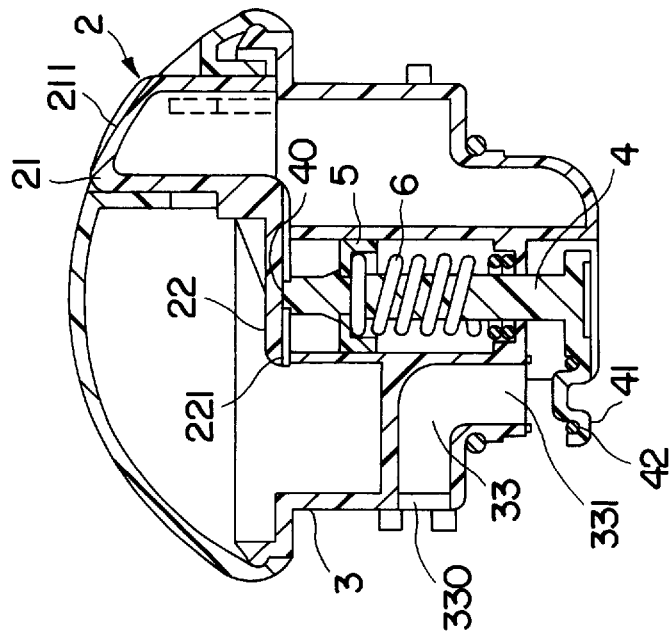
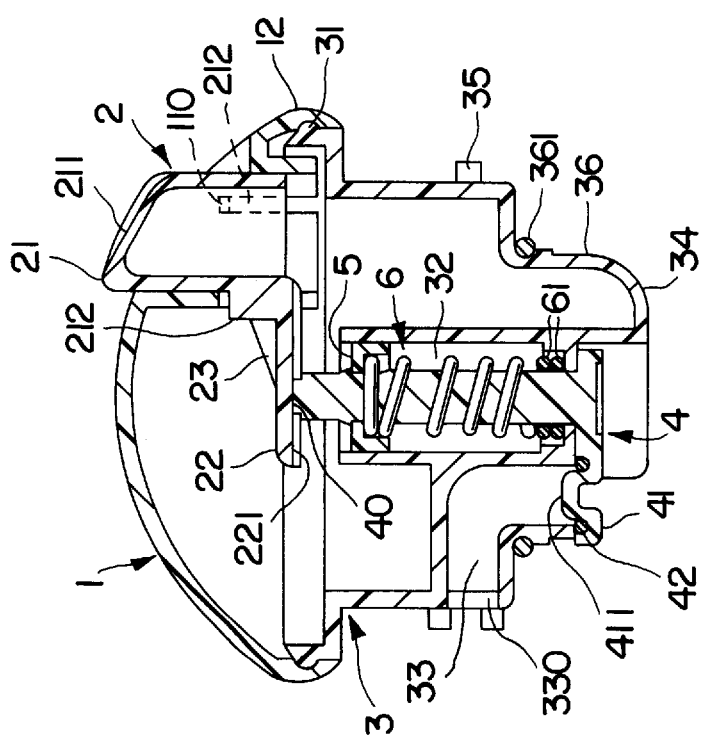

5,875,941

1

CAP ASSEMBLY FOR A CONTAINER

BACKGROUND OF THE INVENTION

1. Field of the Invention

The present invention relates to a cap assembly adapted to be mounted on an open top end of a container, such as a heat insulating flask, more particularly to a cap assembly which can be operated by applying pressure to a press member of the same to permit pouring out the contents of the flask.

2. Description of the Related Art

Conventionally, the open top end of a heat insulating flask is closed by a cap which plugs tightly the top end or which is mounted threadedly on the top end of the flask. The cap should be removed or loosened when pouring out the content of the flask. Therefore, the heat insulating effect of the flask is reduced, and the flask is inconvenient to use. Moreover, injuries might result when a flask containing hot fluid therein is accidentally overturned without plugging the open top end of the flask tightly.

SUMMARY OF THE INVENTION

The object of the present invention is to provide a cap assembly which is adapted to be mounted on an open top end of a container, which can be operated by applying pressure to a press member of the same to permit pouring out the contents of the flask, and which returns automatically to a position in which the top end of the flask is closed when the applied pressure is released.

Accordingly, the cap assembly of the present invention includes a valve seat member having a tubular outer wall adapted to be mounted on the open top end of the container, and an inner tube disposed in the outer wall and having an axis parallel to an axis of the outer wall. The inner tube has a bottom end formed with an aperture. The outer wall is formed with a radial outlet. The valve seat member further has an L-shaped fluid conduit with an open bottom end that is adapted to communicate an interior of the container with the radial outlet. A stem member extends upwardly through the inner tube via the aperture and has a bottom end provided with a valve piece. The stem member is provided with biasing means for biasing the valve piece to seal the open bottom end of the fluid conduit. A cap body has a top portion formed with an opening, and a peripheral portion mounted on a top end of the outer wall of the valve seat member. A press member has an operating portion extending upwardly and slidably through the opening in the cap body, and a pressing portion abutting against a top end of the stem member. The stem member is movable downwardly such that the valve piece is moved away from the open bottom end of the fluid conduit when the operating portion of the press member is pressed downwardly.

BRIEF DESCRIPTION OF THE DRAWINGS

Other features and advantages of the present invention will become apparent in the following detailed description of the preferred embodiment with reference to the accompanying drawings, of which:

FIG. 5 is a vertical sectional view illustrating the cap assembly according to the preferred embodiment;

FIG. 6 is a vertical sectional view illustrating the cap assembly according to the preferred embodiment in which the press member is pressed downwardly;

DETAILED DESCRIPTION OF THE PREFERRED EMBODIMENT

Figure 1:
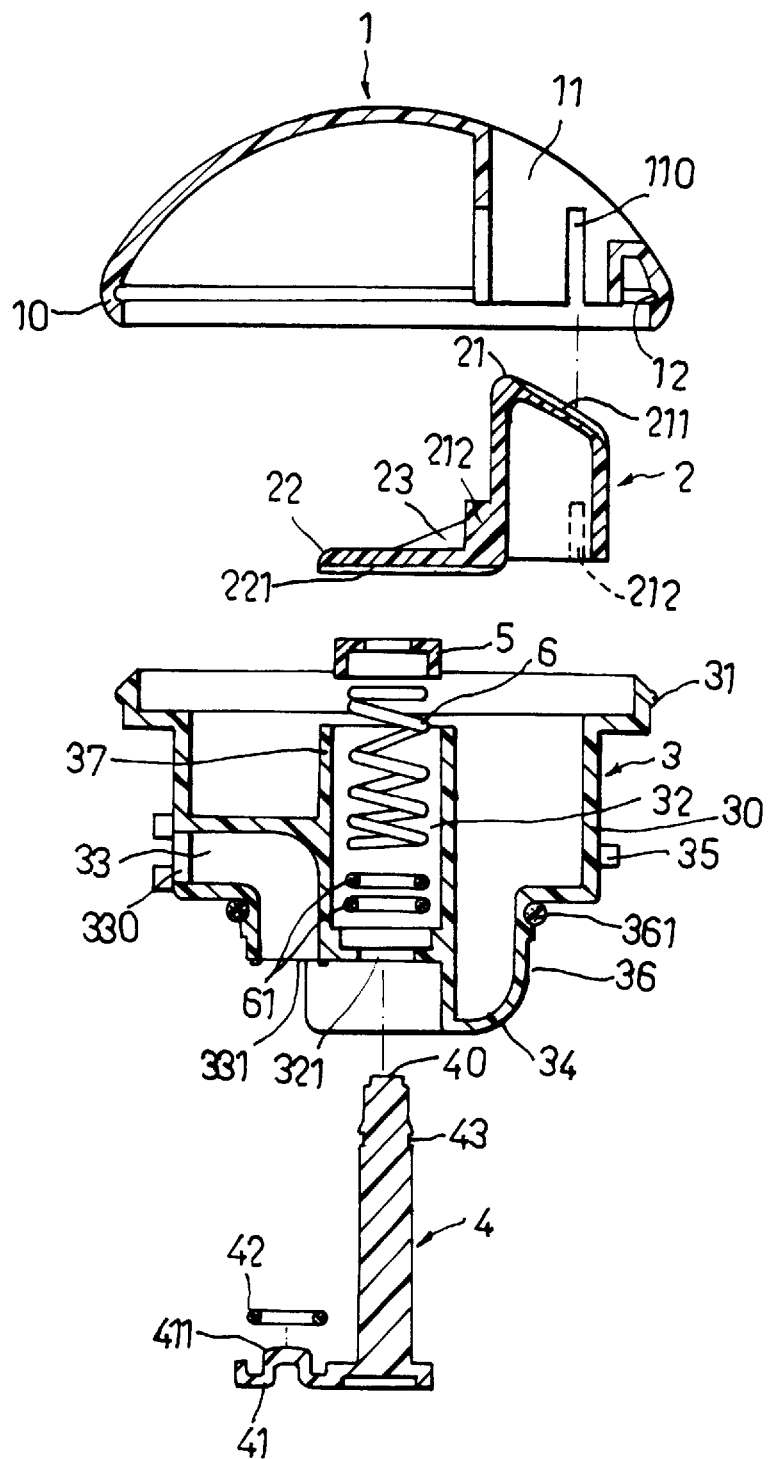
FIG. 1 is an exploded, vertical sectional view illustrating a cap assembly according to a preferred embodiment of the present invention.

As shown in FIG. 1, the cap assembly according to a preferred embodiment of the present invention includes a cap body 1, a press member 2, a valve seat member 3, and a stem member 4.

The valve seat member 3 has a tubular outer wall 30 with a vertical axis. The outer wall 30 is formed with an external screw thread 35 for mounting on an open top end of a container. The outer wall 30 has a top end formed with an outwardly and radially protruding annular rim portion 31. The valve seat member 3 further has an inner tube 37 which is disposed in the outer wall 30 and which also has a vertical axis parallel to the vertical axis of the outer wall 30. The inner tube 37 confines a guiding space 32 and has a bottom end formed with an aperture 321. The outer wall 30 is formed with a radial outlet 330 and an L-shaped fluid conduit 33 which connects the outer wall 30 and the inner tube 37 and which has an open bottom end 331 that is adapted to communicate an interior of the container with the radial outlet 330. The outer wall 30 of the valve seat member 3 further has a downwardly extending abutment portion 34 which is located between and which connects the outer wall 30 and the inner tube 37 and which is angularly spaced from the open bottom end 331 of the fluid conduit 33. The tubular outer wall 30 has a narrower lower section 36 which is adapted to extend into the interior of the container and which is provided with a first sealing ring 361 for sealing the open top end of the container.

The stem member 4 extends upwardly into the guiding space 32 of the inner tube 37 of the valve seat member 3 via the aperture 321. The stem member 4 has a restricted top end 40 and a bottom end provided with a lateral valve piece 41. The stem member 4 is formed with an annular retaining groove 43 around the periphery thereof and is provided with biasing means which includes a retaining ring 5 that engages the retaining groove 43 and a biasing spring 6 that is sleeved on the stem member 4. The biasing spring 6 has a first end abutting against the retaining ring 5 and a second end abutting against the bottom end of the inner tube 37 of the valve seat member 3 for biasing the stem member 4 upwardly so that the valve piece 41 of the stem member 4 seals the open bottom end 331 of the fluid conduit 33. A pair of second sealing rings 61 are provided at the bottom end of the inner tube 37 and around the stem member 4 so as to prevent leakage of fluid received in the container into the inner tube 37. The valve piece 41 has an upwardly protruding middle portion 411 which can be fittingly received in the open bottom end 331 of the fluid conduit 33 of the valve seat member 3. A third sealing ring 42 is provided around the middle portion 411 of the valve piece 41 so as to seal the open bottom end 331 of the fluid conduit 33.

Figure 2:
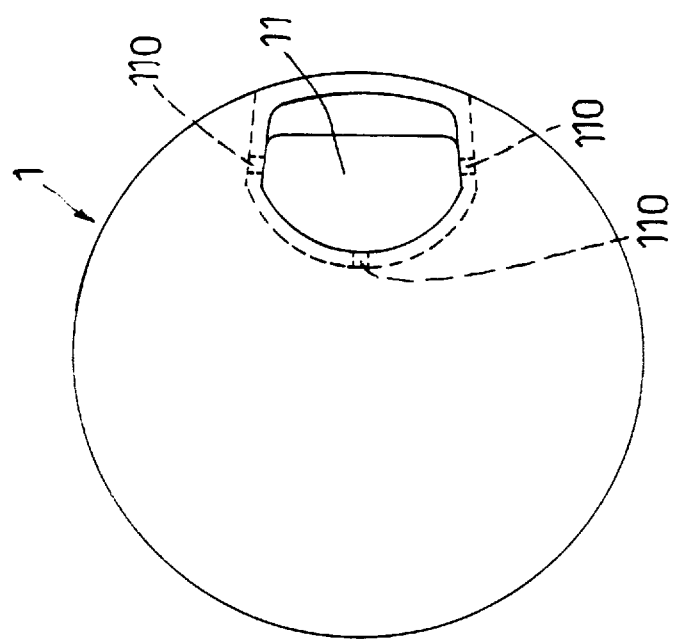
FIG. 2 is a top view showing a cap body of the cap assembly of the preferred embodiment.

Referring to FIGS. 1 and 2, the cap body 1 is substantially dome-shaped and has a top portion formed with an opening 11, and a peripheral portion 10 with an inner surface formed with an annular peripheral groove 12 which engages the annular rim portion 31 of the top end of the outer wall 30 of the valve seat member 3. An inner surface defining the opening 11 is formed with three spaced vertical key ways 110.

Figure 4:
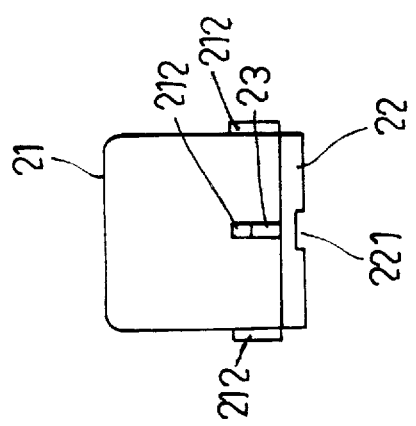
FIG. 4 is a side view showing the press member of the preferred embodiment.
Figure 3:
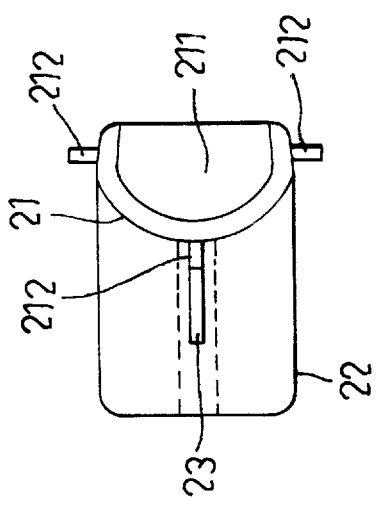
FIG. 3 is a top view showing a press member of the cap assembly of the preferred embodiment.

Referring to FIG. 1, in combination with FIGS. 3 and 4, the press member 2 has an upright operating portion 21 with an inclined top surface which includes a slightly indented part 211 for the user to place his finger thereon to facilitate pressing of the operating portion 21. The operating portion 21 has an outer surface formed with three spaced vertical key projections 212 for engaging slidably the key ways 110 in the cap body 1 so that the press portion 21 can be guided to extend upwardly and slidably through the opening 11 in the cap body 1. The press member 2 further has a plate-like pressing portion 22 which extends horizontally and integrally from a bottom end of the operating portion 21 and which abuts against the top end 40 of the stem member 4. The pressing portion 22 has a bottom side formed with a recess 221 which fittingly receives the restricted top end 40 of the stem member 4 therein so as to prevent lateral movement of the stem member 4. A reinforcing rib 23 is provided between the operating portion 21 and the pressing portion 22 to reinforce the press member 2.

Referring to FIGS. 5 and 6, when the indented part 211 of the operating portion 21 of the press member 2 is pressed downwardly, the pressing portion 22 presses the top end 40 of the stem member 4 so that the stem member 4 moves downwardly to compress the biasing spring 6 and to move the valve piece 41 away from the open bottom end 331 of the fluid conduit 33, thereby permitting the fluid received in the container to be poured out through the radial outlet 330. When the operating portion 21 is released, the biasing spring 6 biases the stem member 4 upwardly so that the press member 2 returns to the original state thereof. At this time, the valve piece 41 is moved upwardly with the stem member 4 to once again seal the open bottom end 331 of the fluid conduit 33.

Figure 8:
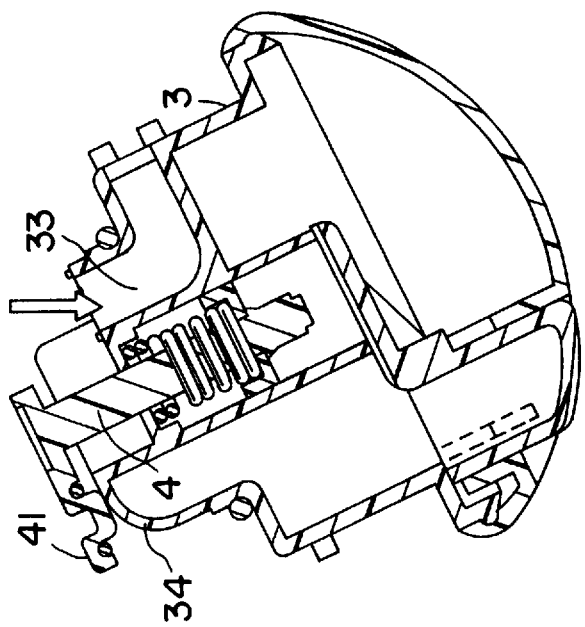
FIGS. 7 and 8 illustrate how a fluid conduit of the cap assembly of the preferred embodiment can be rinsed.
Figure 7:
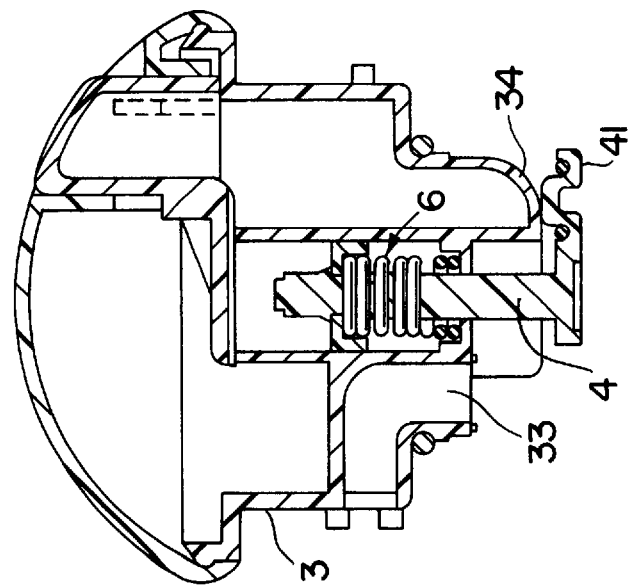

When the fluid conduit 33 is to be rinsed, as shown in FIGS. 7 and 8, the cap assembly is removed from the container and the stem member 4 thereof is moved downwardly against the biasing force of the biasing spring 6 such that the valve piece 41 is rotatable relative to the valve seat member 3 to a position immediately under the abutment portion 34. The valve seat member 3 can be retained in this position by virtue of its abutment against the portion 34 so as to keep the fluid conduit 33 in an open state. The cap assembly is then turned upside down, as shown in FIG. 8, so that a stream of water can be guided conveniently into the fluid conduit 33 to wash the interior thereof.

Figure 9:
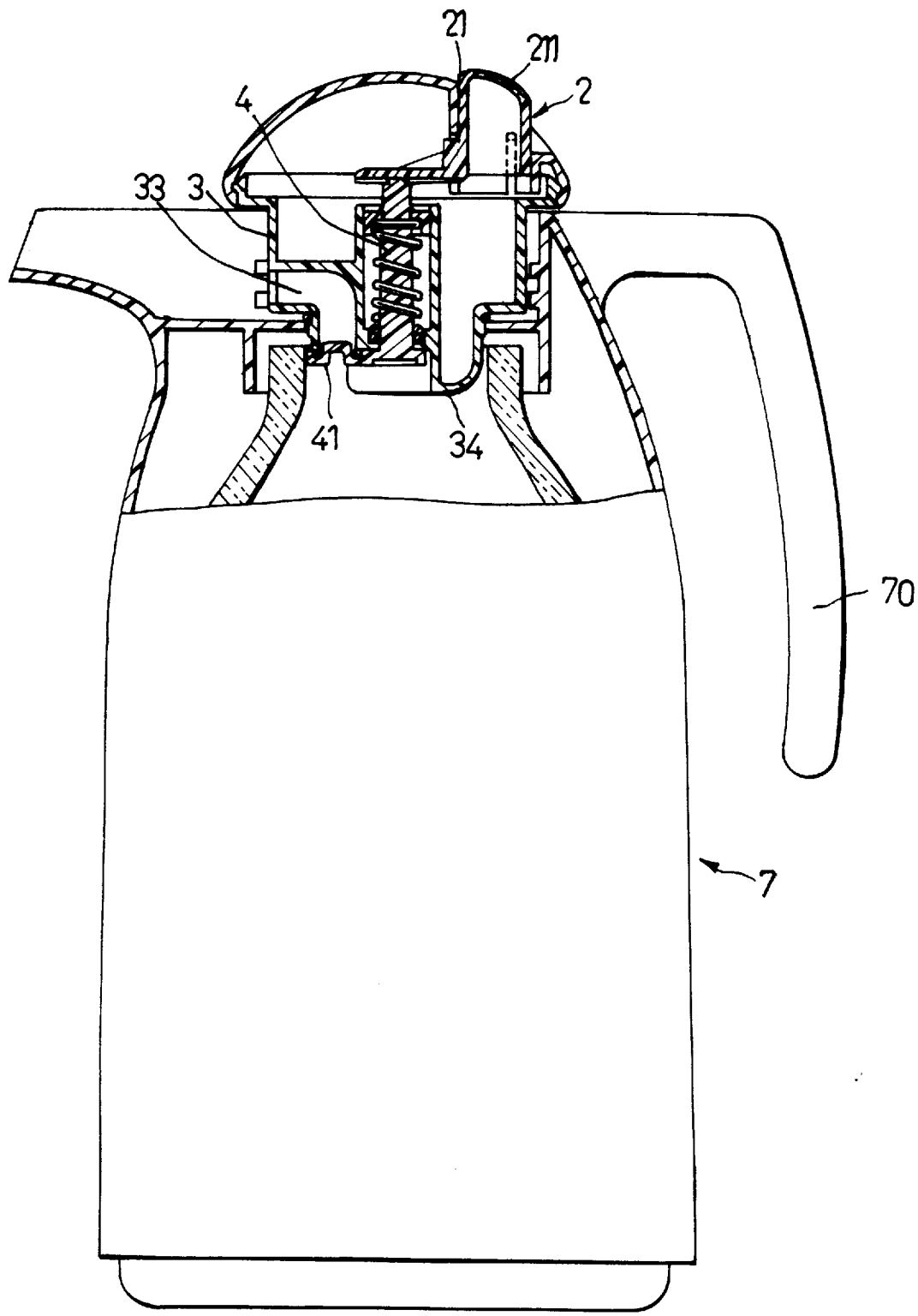
FIG. 9 illustrates how the cap assembly of the preferred embodiment is mounted on a container.

Referring to FIG. 9, when the cap assembly is installed on the open top end of a container 7 with a handle 70, the cap assembly can be operated by the thumb of one hand of the user with the other fingers of the hand gripping the handle 70. The cap assembly can thus be operated without the need for removing or loosening the cap assembly from the open top end of the container 7. The cap assembly is thus more convenient to use than the conventional ones. Moreover, since the operating portion 21 of the press member 2 springs back automatically when it is released, a relatively short time period exists between the open and close states of the cap assembly. As such, when the cap assembly is used with a heat insulating flask, the heat insulating effect thereof will not be reduced significantly. In addition, the cap assembly is more safe to use when hot fluid is received in the container. A further advantage of the cap assembly of the present invention is that the fluid conduit 33 therein can be easily and thoroughly rinsed.

With this invention thus explained, it is apparent that numerous modifications and variations can be made without departing from the scope and spirit of this invention. It is therefore intended that this invention be limited only as indicated in the appended claims.

I claim:

1. A cap assembly adapted to be mounted on an open top end of a container, said cap assembly comprising:

a valve seat member having a tubular outer wall adapted to be mounted on the open top end of the container, and an inner tube disposed in said outer wall and having an axis parallel to an axis of said outer wall, said inner tube having a bottom end formed with an aperture, said outer wall being formed with a radial outlet, said valve seat member further having an L-shaped fluid conduit with an open bottom end that is adapted to communicate an interior of the container with said radial outlet;

a stem member extending upwardly through said inner tube via said aperture and having a bottom end provided with a valve piece, said stem member being provided with biasing means for biasing said valve piece to seal said open bottom end of said fluid conduit;

a cap body having a top portion formed with an opening, and a peripheral portion mounted on a top end of said outer wall of said valve seat member; and a press member having an operating portion extending upwardly and slidably through said opening in said cap body, and a pressing portion abutting against a top end of said stem member;

said stem member being movable downwardly such that said valve piece is moved away from said open bottom end of said fluid conduit when said operating portion of said press member is pressed downwardly;

wherein said outer wall of said valve seat member has a downwardly extending abutment portion which is angularly spaced from said open bottom end of said fluid conduit, said stem member being movable downwardly against biasing force of said biasing means such that said valve piece is rotatable relative to said valve seat member so as to abut against a bottom side of said abutment portion.

2. The cap assembly according to claim 1, wherein said fluid conduit connects said outer wall and said inner tube.

3. The cap assembly according to claim 1, wherein said biasing means includes a retaining ring mounted on said stem member and a biasing spring sleeved on said stem member, said biasing spring having a first end abutting against said retaining ring and a second end abutting against said bottom end of said inner tube of said valve seat member.

4. The cap assembly according to claim 1, wherein said abutment portion connects said outer wall and said inner tube.

5. The cap assembly according to claim 1, wherein said operating portion of said press member has an outer surface formed with a key projection, and said cap body has an inner surface that defines said opening and that is formed with a key way for engaging slidably said key projection to guide movement of said press member relative to said cap body.

6. The cap assembly according to claim 1, further comprising a sealing ring provided around said stem member so as to prevent leakage of fluid received in the container into said inner tube.

7. The cap assembly according to claim 1, wherein said valve piece of said stem member has an upwardly protruding middle portion which can be fittingly received in said bottom end of said fluid conduit of said valve seat member.

8. The cap assembly according to claim 7, further comprising a sealing ring provided around said middle portion of said valve piece so as to seal said bottom end of said fluid conduit.

\* \* \* \* \*